Figure 1:
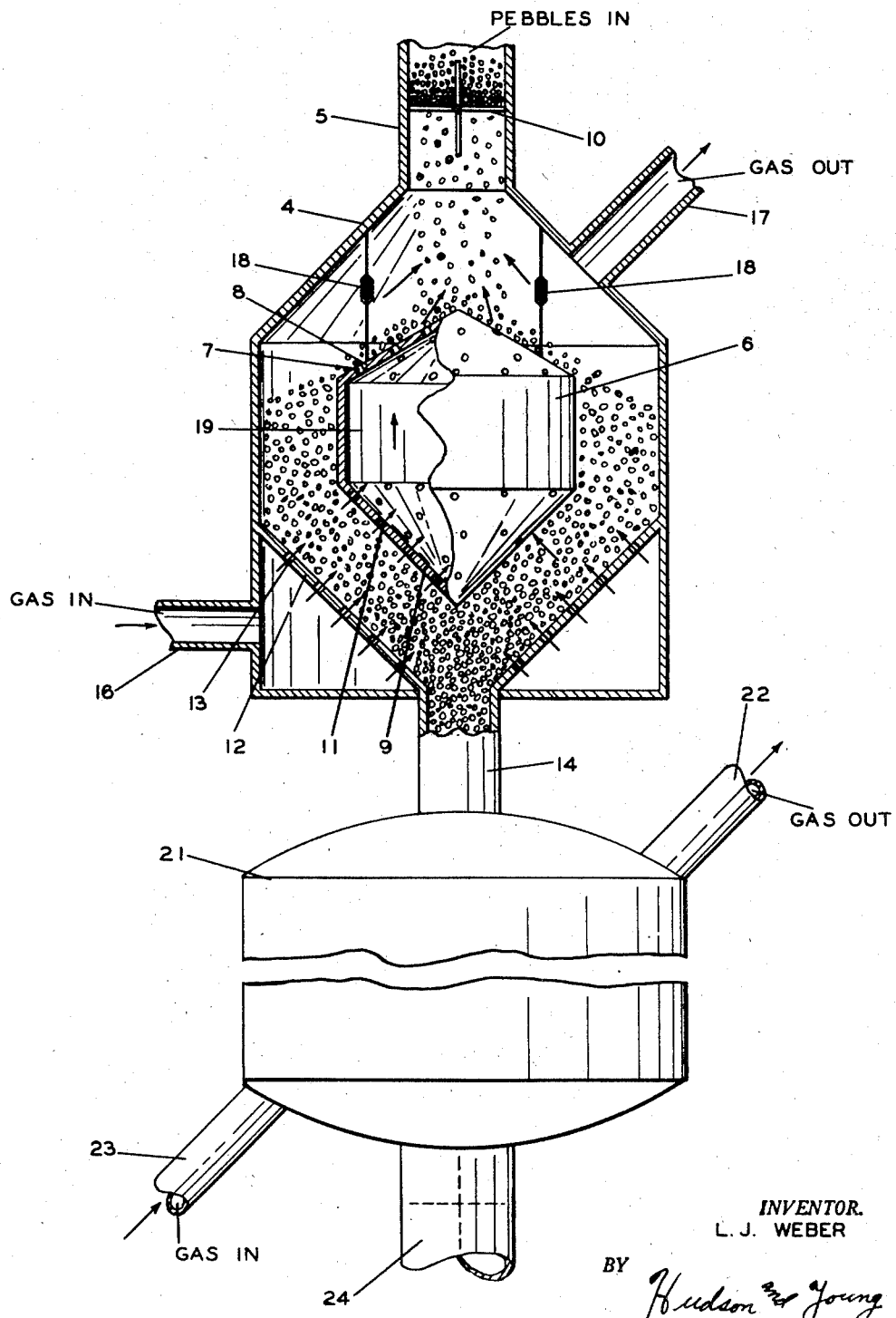

INVENTOR.
L. J. WEBER

INVENTOR.
L. J. WEBER
BY
ATTORNEYS

Patented Nov. 20, 1951

2,576,058

UNITED STATES PATENT OFFICE 2,576,058

PROCESS AND APPARATUS FOR HEAT EXCHANGE EMPLOYING GRANULAR PARTICLES

Louis J. Weber, Bartlesville, Okla., assignor to Phillips Petroleum Company, a corporation of Delaware Application August 12, 1946, Serial No. 689,979

10 Claims. (Cl. 257—255)

This invention relates to a contact chamber. One aspect of this invention relates to apparatus adapted to ensure equal contact time between a fluid and a granular substance. Another aspect of this invention relates to apparatus for controlling the shape of a contact bed in a contact chamber.

A more particular aspect of this invention relates to the improvement in the design of a pebble heater type apparatus.

Direct contact between fluids and solids have become of great importance in various chemical industries. Especially in the conversion of hydrocarbons, granular material is contacted with fluids either as a catalyst or as a heat transfer medium. Whether the granular material is used as a heat transfer medium or as a catalyst, various problems relating to the contact zone arise during the process, such as contact time between the fluids and granular material, the flow of the granular material through the contact chamber, shape of the contact bed, etc. Since the stream of granular material is allowed to seek its own shape with regard to the contact bed as it passes into the contact chamber, the shape of the contact bed top is usually conical. Such a conical top of the contact bed may be undesirable because a longer contact time between fluid and contact material is obtained in the center of the bed than at its periphery. It is much to be desired, therefore, to provide an apparatus for controlling the shape of the contact bed and for controlling contact time between the fluid and granular material.

It is an object of this invention to provide a novel apparatus for contact between solids and fluids.

Another object of this invention is to provide apparatus for uniform contact time between granular material and fluids.

Still another object of this invention is to provide means for controlling the shape of a contact bed of granular material in a pebble heater type apparatus.

It is still a further object of this invention to provide an improvement in the construction of pebble heater type apparatus whereby equal contact time between fluids and granular material is obtained throughout.

Various other objects and advantages of the present invention will become apparent to those skilled in the art from the accompanying description and disclosure.

In the drawing—

Figure 1 of the drawing diagrammatically illustrates, partially in cross-section, an elevational view of a contact chamber according to this invention as applied to pebble heater type apparatus.

Figure 2:
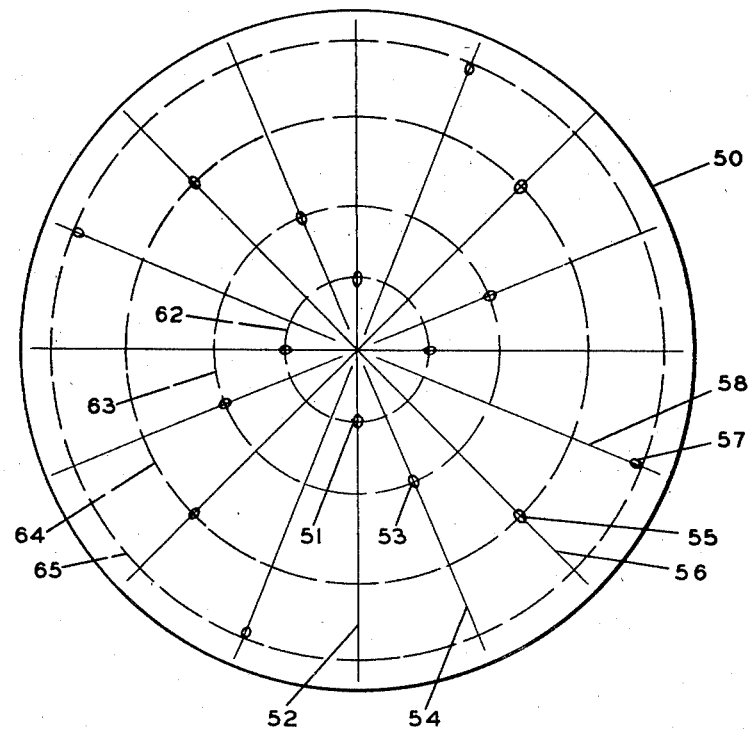
Figure 3:
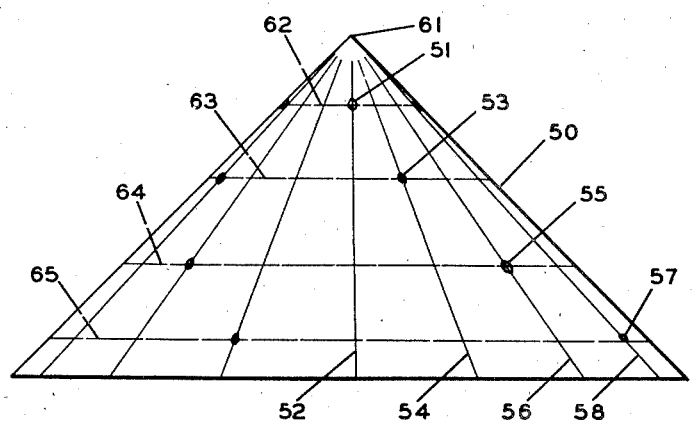

Figures 2 and 3 diagrammatically show the top and side elevational view, respectively, of a conical baffle constructed so as to control the shape of a contact bed in a contact chamber.

In Figure 1 of the drawing element 4 comprises the heating chamber of a pebble heater type apparatus having a perforated conical collecting means or bottom 12, a pebble inlet 5 in the upper portion thereof, a fluid inlet 16 in the lower portion thereof and a fluid outlet 17 in the upper portion thereof. A baffle chamber 6 is provided for controlling the contact time between fluid and pebbles in chamber 4. Baffle 6 comprises a perforated conical top 8, cylindrical sides 19 and a perforated conical bottom 9. Perforations 7 and 11 are of such size that fluid may pass therethrough while at the same time pebbles can not pass therethrough. A star valve 10 is provided for regulating the flow of pebbles into chamber 4. Baffle chamber 6 is supported by suitable adjustable supports 18. The shape of conical bottom 9 of chamber 6 is geometrically similar to the shape of perforated conical bottom 12 of chamber 4 and is so situated concentrically within chamber 4 that fluid passes through perforations 13 and through a uniformly thick layer of granular material. An outlet conduit 14 is provided for passing pebbles from upper chamber 4 into reaction chamber 21 situated below chamber 4. Lower chamber 21 has suitable outlets and inlets, such as gas inlet 23 and pebble outlet 24 in the lower portion thereof and gas outlet 22 in the upper portion thereof.

A baffle chamber similar to baffle chamber 6 may be positioned in reaction chamber 21 in order to ensure uniform contact time between pebbles and reactants in chamber 21 without departing from the scope of this invention. Although the various inlets and outlets are preferably located as shown for countercurrent flow of pebbles and fluids, the particular location of these outlets and inlets is not considered limiting to this invention. As shown, the pebble inlets and outlets are located for the downward flow of pebbles through the two chambers. The gas outlets and inlets may be omitted, and instead common inlets and outlets for gases and pebbles may be used. Conduits 14 and 24 may contain suitable valves (not shown) for regulating the flow of pebbles therethrough.

Although Figure 1 of the drawing shows the preferred embodiment of this invention, in its broadest aspect this embodiment of the invention comprises two concentric vessels having perforated and geometrically similar bottoms forming an annulus therebetween whereby equal contact time is made between all of the fluid and contact material passing through such a contact chamber. Obviously, therefore, the shape of bottom 9 of baffle chamber 6 and the shape of bottom 12 of contact chamber 4 may be of various proportions, such as spherical; however, a pyramidal or conical bottom is much to be preferred.

In the modification shown in Figures 2 and 3 of the drawing, baffle 6 comprises a conical or pyramidal shaped plate or disc 50 having perforations therein. In this modification the perforations are of such size that the pebbles pass therethrough whereas in the modification shown in Figure 1 they are of such size that the pebbles cannot pass therethrough. Perforations of Figures 2 and 3 are spaced on concentric circles on cone 50, such as concentric circles 62, 63, 64 and 65. These perforations are staggered on the concentric circles with respect to the preceding perforation, such as perforations 51, 53, 55 and 57, forming a helix from the apex to the base of cone 50 and such that only one perforation is spaced on a straight line drawn from the apex of the cone to the base thereof, such as lines 52, 54, 56 and 58 of Figures 2 and 3. In this manner the pebbles fall through the perforations in such a manner that the desired shape of the contact bed is obtained. Variations of the size and shape of the holes, their proximity to each other and their numbers may be practiced in order to achieve the shape of the contact bed desired without departing from the scope of this invention.

*Operation*

In Figure 1 pebbles flow through inlet conduit 5 and star valve 10 into heating chamber 4 of a pebble heater type apparatus. Pebbles fall upon top 8 of baffle chamber 6 and are deflected outwardly into the annular space between baffle chamber 6 and the sides of heating chamber 4. Pebbles accumulate in this annular space to the desired height and flow uniformly from heating chamber 4 into lower reaction chamber 21 through outlet conduit 14. Pebbles in heating chamber 4 are heated by hot flue gases from a furnace, which flue gases are introduced into chamber 4 through inlet conduit 16. The flue gases pass through perforations 13 of bottom 12 of heating chamber 4, then through the pebbles accumulating in chamber 4 and finally through perforations 11 of bottom 9 into hollow baffle chamber 6. Gases flow from baffle chamber 6 through perforations 7 of top 8 into the upper portion of heating chamber 4 and are withdrawn from heating chamber 4 through outlet 17. If desired, side 19 of baffle chamber 4 may be perforated instead of top 8 so that the gases flow from baffle chamber 4 through perforations in side 19.

Pebbles, which are at the desired temperature, pass from heating chamber 4 through conduit 14 into reaction chamber 21. In lower chamber 21 the pebbles form a contact bed through which reactants pass. Gaseous reactants are introduced into reaction chamber 21 through inlet conduit 23 and pass countercurrently through the contact bed of chamber 21 and are withdrawn through outlet conduit 22. Pebbles are withdrawn from reaction chamber 21 through outlet conduit 24 and are passed by means of a conventional conveyor (not shown) from outlet 24 to inlet 5 of the heating chamber 4. Products of the reaction having been removed from chamber 21 through outlet conduit 22 are passed to subsequent equipment (not shown) for further treatment and separation, as desired.

Since baffle chamber 6 is concentrically positioned within heating chamber 4, bottom 9 of baffle 6 is similar in shape to bottom 12 of chamber 4, flue gases pass through a uniformly thick layer of pebbles in the annular space between baffle 6 and chamber 4 whereby the pebbles are uniformly heated to the desired temperature. Chamber 4 may comprise a regeneration chamber for burning carbonaceous deposits from catalytic material; thus, the burning process may be adequately and conveniently regulated to ensure uniform regeneration of the catalyst by construction of apparatus according to this invention. Various other applications of baffle 6, such as in reaction chamber 21, may be used without departing from the scope of this invention. Distances between bottoms 9 and 12 are adjusted by supports 18.

In the modification of baffle 6 shown as baffle 50 in Figures 2 and 3, pebbles fall from inlet 5 of Figure 1 onto the apex of baffle 50 and fall downwardly toward its base. All of the pebbles falling along imaginary line 52 pass through hole 51. Similarly, pebbles falling along imaginary line 54 pass through hole 53, pebbles falling along imaginary line 56 pass through hole 55 and pebbles falling along imaginary line 58 pass through opening 57. All of the pebbles falling along these imaginary lines pass through the respective holes on each imaginary line and any additional holes below the first hole on the same imaginary line would be of no usefulness since no pebbles pass further than the first hole. The number and size of the holes are dependent upon size and shape of the pebbles or granular material being distributed in the chamber to form the contact bed. All of the holes or perforations in any one particular baffle may be of uniform size. It is entirely possible that the holes will be graduated in size in each succeeding ring of holes, which modification depends upon the surface of the pebble bed desired. It should be understood that the surface of the pebble bed may be shaped in the form of a cone, the limit of this cone being the static angle of repose of the pebbles. From a cone of this shape, the cone may be gradually decreased in altitude until the surface of pebbles is actually flat. And in some cases with the correct design of size and number of holes in the baffle, the pebble bed may be shaped as an inverted cone. In this latter instance, the major portion of pebbles would be distributed off the periphery of the baffle and then would flow toward the center of the chamber to form an inverted cone, the limit again being the static angle of repose of the granular material.

It is apparent that in many cases it will be desirable to shape the top of the pebble bed in the form of an inverted cone so as to conform to the conical bottom of the chamber, which inverted cone type bed may be formed either by a baffle chamber 6 or a baffle plate 50. In this manner it is possible to produce a pebble bed of uniform pressure drop with respect to the flow of fluid therethrough. Essentially, the invention of this application comprises the use of a baffle of a particular design which either by its own shape or by regulation and distribution of the pebbles themselves forms a pebble bed of the desired shape whereby uniform flow and equal contact time of the pebble and fluid are achieved. Various modifications of the apparatus and various applications to other processes may be practiced by those skilled in the art without departing from the scope of this invention.

I claim:

1. Apparatus for effecting heat-exchange between a gravitating mass of refractory pebbles and a stream of gas under substantially uniform contact conditions, which comprises a closed upright vessel having an axial pebble inlet in the top thereof and a hopper-shaped perforate false bottom converging to an axial pebble outlet extending through the bottom of said vessel, said false bottom forming an annular gas chamber with the lower end section of said vessel; an inlet in said lower end section communicating with said gas chamber; a gas outlet in the top section of said vessel; and a baffle chamber having upright impervious walls, a perforate top, and a perforate bottom similar in shape to the bottom of said vessel, said baffle chamber being disposed axially in spaced apart relation to the inner walls of said vessel so as to provide an annular pebble space surrounding the walls and bottom of said chamber.

2. In combination with the apparatus of claim 1 a second heat-exchange vessel connected by conduit means therewith and arranged for continuous gravitation of pebbles through both vessel and said conduit means, said second heat-exchanger having openings in the top and bottom sections thereof for flow of gas therethrough in direct heat-exchange with said pebbles.

3. Apparatus for effecting heat-exchange between a gravitating mass of refractory pebbles and a stream of gas under substantially uniform contact conditions, which comprises a closed upright vessel having an axial pebble inlet in the top thereof and a hopper-shaped perforate false bottom converging to an axial pebble outlet extending through the bottom of said vessel, said false bottom forming an annular gas chamber with the lower end section of said vessel; an inlet in said lower end section communicating with said gas chamber; a gas outlet in the top section of said vessel; and a baffle chamber having upright impervious walls, a perforate top, and a perforate hopper-shaped bottom, said baffle chamber being disposed axially in spaced apart relation to the inner walls of said vessel so as to provide an annular pebble space surrounding the walls and bottom of said chamber.

4. In combination with the apparatus of claim 3 a second heat-exchange vessel connected by conduit means therewith and arranged for continuous gravitation of pebbles through both vessels and said conduit means, said second heat-exchanger having openings in the top and bottom sections thereof for flow of gas therethrough in direct heat-exchange with said pebbles.

5. Apparatus for effecting heat-exchange between a gravitating mass of refractory pebbles and a stream of gas under substantially uniform contact conditions, which comprises a closed upright vessel having an axial pebble inlet in the top thereof and a hopper-shaped perforate false bottom converging to an axial pebble outlet extending through the bottom of said vessel, said false bottom forming an annular gas chamber with the lower end section of said vessel; an inlet in said lower end section communicating with said gas chamber; a gas outlet in the upper portion of said vessel; and a baffle chamber having upright impervious walls, a perforate pyramidal top and a perforate hopper-shaped bottom, said baffle chamber being disposed axially in spaced apart relation to the inner walls of said vessel so as to provide an annular pebble space surrounding the walls and bottom of said chamber.

6. In combination with the apparatus of claim 5 a second heat-exchange vessel connected by conduit means therewith and arranged for continuous gravitation of pebbles through both vessels and said conduit means, said second heat-exchanger having openings in the top and bottom sections thereof for flow of gas therethrough in direct heat-exchange with said pebbles.

7. Apparatus for effecting high temperature heat-exchange between a gravitating mass of refractory pebbles and a stream of gas under substantially uniform contact conditions, which comprises a closed upright imperforate cylindrical vessel having a convex top with an axial pebble inlet therein and an inverted conical perforate false bottom terminating in a pebble outlet conduit extending through the bottom of said vessel, said false bottom forming an annular gas chamber with the lower end section of said vessel; an inlet in said lower end section communicating with said gas chamber; a gas outlet in the upper end of said vessel; and a baffle chamber having impervious cylindrical sidewalls and convex conical perforate top and bottom closure members, said baffle chamber being fixed axially within said vessel in spaced apart relation thereto on all sides so as to form a pebble passageway around said baffle chamber and provide uniform gas flow between said conical false bottom and the bottom of said baffle chamber when a compact mass of pebbles is gravitated through said vessel.

8. A process for effecting heat-exchange between a gravitating compact mass of particulate solid refractory material and a gas under substantially uniform contact conditions of time and flow, which comprises gravitating a compact mass of said material to the upper end of a heat-exchange zone completely surrounding an inner confined gas collection and distribution zone; gravitating said material over the top and sides of said inner zone and through an annulus of uniform thickness from outer to inner boundaries converging downwardly and inwardly to a common outlet stream; simultaneously passing a gas upwardly and inwardly through said annulus in direct contact with said material under heat-exchange conditions therewith so as to change the temperature of said gas and said material; passing said gas upwardly through and out the top of said inner zone and in direct heat-exchange with said material above said inner zone; and removing said gas from a section of said heat-exchange zone at a higher level than the top of said inner zone.

9. The process of claim 8 in which the feed gas is at a higher temperature than the heat-exchange material.

10. The process of claim 8 in which the heat-exchange material is at a higher temperature than the feed gas.

LOUIS J. WEBER.

REFERENCES CITED

The following references are of record in the file of this patent:

UNITED STATES PATENTS

| Number | Name | Date |
|---|---|---|
| 1,341,676 | Robert | June 1, 1920 |
| 2,407,700 | Huff | Sept. 17, 1946 |

FOREIGN PATENTS

| Number | Country | Date |
|---|---|---|
| 29,835 of 1912 | Great Britain | Nov. 6, 1913 |